United States Patent
Noguchi

(10) Patent No.: US 9,995,386 B2
(45) Date of Patent: Jun. 12, 2018

(54) TRANSMISSION CONTROL DEVICE FOR AUTOMATIC TRANSMISSION

(71) Applicant: HONDA MOTOR CO., LTD., Tokyo (JP)

(72) Inventor: Tomoyuki Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/546,515

(22) PCT Filed: Feb. 5, 2016

(86) PCT No.: PCT/JP2016/053539
§ 371 (c)(1),
(2) Date: Jul. 26, 2017

(87) PCT Pub. No.: WO2016/129529
PCT Pub. Date: Aug. 18, 2016

(65) Prior Publication Data
US 2018/0017157 A1    Jan. 18, 2018

(30) Foreign Application Priority Data
Feb. 12, 2015    (JP) .................................. 2015-025562

(51) Int. Cl.
*F16H 61/02*    (2006.01)
*F16H 59/66*    (2006.01)
(Continued)

(52) U.S. Cl.
CPC ......... *F16H 61/0213* (2013.01); *F16H 59/22* (2013.01); *F16H 59/66* (2013.01);
(Continued)

(58) Field of Classification Search
CPC ...... F16H 61/0213; F16H 61/16; F16H 59/66; F16H 2061/0237; F16H 59/0204; F16H 2059/666
See application file for complete search history.

(56) References Cited

U.S. PATENT DOCUMENTS 8,718,916 B2 *    5/2014    Suzuki ................... G08G 1/166
                                                    340/435
8,736,483 B2 *    5/2014    Takeuchi .............. B60W 30/09
                                                    342/71
(Continued)

FOREIGN PATENT DOCUMENTS

JP    10-227357    8/1998
JP    2000-283286    10/2000
(Continued)

OTHER PUBLICATIONS

International Search Report, dated May 10, 2016 (dated May 10, 2016), 1 page.

*Primary Examiner* — David J Hlavka
(74) *Attorney, Agent, or Firm* — Rankin, Hill & Clark LLP

(57) ABSTRACT

A transmission controller includes: a corner detector that detects a corner; a predictor to predict a rolling amount based upon road data when the corner is detected and an accelerator opening degree is fully closed; a device to determine a first necessary engine braking amount in accordance with the rolling amount; a device to determine a first required speed change stage corresponding to the first necessary engine braking amount; a calculator to calculate a second necessary engine braking amount when the corner is detected and the accelerator opening degree is fully closed based upon a minimum required inter-vehicle distance with the vehicle ahead; a device to determine a second required speed change stage corresponding to the second engine (Continued)

braking amount; and a transmission controller to select, as a target speed change stage, either smaller one of the first or second required speed change stage, and then perform downshift control.

3 Claims, 11 Drawing Sheets

(51) Int. Cl.
    *F16H 59/22*     (2006.01)
    *F16H 61/16*     (2006.01)
    *F16H 59/02*     (2006.01)

(52) U.S. Cl.
    CPC .... *F16H 61/16* (2013.01); *B60Y 2300/18133* (2013.01); *F16H 59/0204* (2013.01); *F16H 2059/666* (2013.01); *F16H 2061/0237* (2013.01)

(56) References Cited

U.S. PATENT DOCUMENTS

| | | | | |
|---|---|---|---|---|
| 8,862,379 | B2* | 10/2014 | Gilbert | B60T 7/22 |
| | | | | 340/436 |
| 9,384,645 | B1* | 7/2016 | Allen | G08B 3/10 |
| 9,428,160 | B2* | 8/2016 | Udaka | B60T 7/22 |
| 9,478,135 | B2* | 10/2016 | Fujishiro | B60T 7/22 |
| 9,666,077 | B2* | 5/2017 | Ouchi | G08G 1/166 |
| 2007/0050114 | A1 | 3/2007 | Koike et al. | |

FOREIGN PATENT DOCUMENTS

| | | |
|---|---|---|
| JP | 2005-299704 | 10/2005 |
| JP | 2007-062711 | 3/2007 |
| JP | 2007-091207 | 4/2007 |
| JP | 2007-232109 | 9/2007 |
| JP | 2007-246039 | 9/2007 |

\* cited by examiner

TRANSMISSION CONTROL DEVICE FOR AUTOMATIC TRANSMISSION

TECHNICAL FIELD

The present invention relates to a transmission control device for an automatic transmission and, more specifically, to downshift control in front of a corner.

BACKGROUND ART

In general, a driver of a vehicle may perform a downshift operation in front of a corner for the purpose of, for example, deceleration of the vehicle, stabilization of the vehicle behavior, or immediate generation of driving force at a rising of the corner. By performing the downshift operation in front of the corner, engine braking is effectively usable to achieve the deceleration of the vehicle, the stabilization of the vehicle behavior, or the like.

When the downshift operation is performed by a manual operation in an automatic transmission, the driver performs the downshift by selecting a speed change stage one by one through, for example, a shift lever operation in a manual range, or an operation on a paddle switch disposed on a steering wheel. However, multi-staging of recent automatic transmissions is remarkable, and it is therefore necessary to perform the downshift operation several times until obtaining an intended engine braking amount. This can be time consuming. For example, during traveling at a high speed stage, such as on high speed traveling, the high speed stage has a high ratio and there is a small ratio difference between a plurality of speed change stages. Hence, it particularly takes time to achieve the downshift from the high speed stage to an intended speed change stage.

For example, the following Patent document 1 discloses, as one of automatic downshift control, detecting a corner ahead of a vehicle and determining a speed change stage that becomes a target of downshift, taking the corner ahead into consideration. The following Patent document 2 discloses comparing, on the basis of a current position of a vehicle and road data, a current road shape and a shape on the road data, and restricting switching of speed change stages of an automatic transmission when there is a difference between the two, in cases where control of speed change stages of the automatic transmission is performed while traveling along a corner.

However, merely by performing the corner detection and downshift control according thereto as in the case with these conventional technologies, in some case, the downshift control according to characteristics of the corner is insufficient, or the result of the downshift control does not coincide with the driver's intention.

As an element that a driver considers while traveling along a corner, there is a distance to the vehicle ahead, besides the deceleration in front of the corner as described above. As a conventionally known control according to an inter-vehicle distance with the vehicle ahead, for example, Patent document 3 discloses acquiring information, such as a relative position and a relative distance with respect to the vehicle ahead, by a radar device, and controlling, on the basis of these information, a vehicle speed so as to carry out following travel to the vehicle ahead while keeping the inter-vehicle distance. For example, Patent document 4 discloses collision reduction brake control intended to avoid or reduce a collision by automatically activating a brake when an object ahead of a vehicle is detected by an external sensor, such as a camera and a radar device.

RELATED ART DOCUMENTS

Patent Documents

[Patent Document 1]
 Japanese Unexamined Patent Application Publication No. 2000-283286
[Patent Document 2]
 Japanese Unexamined Patent Application Publication No. Hei 10-227357
[Patent Document 3]
 Japanese Unexamined Patent Application Publication No. 2007-62711
[Patent Document 4]
 Japanese Unexamined Patent Application Publication No. 2007-91207

SUMMARY OF THE INVENTION

The present invention has been made in view of the foregoing points, and aims at providing a transmission control device for an automatic transmission which is configured to automatically perform, when traveling along a corner, downshift control taking into consideration characteristics of the corner and an inter-vehicle distance during passage through the corner.

A transmission control device (10) for an automatic transmission (100) of the present invention according to claim 1 includes: current position detection means (22) to detect a current position of a vehicle; storage means (24) to store road data; corner detection means (12) to detect a corner appearing in a traveling direction of the vehicle on the basis of the detected current position and the stored road data; prediction means (13) to predict, when the corner is detected, a rolling amount exerted on the vehicle during passage through the corner, on the basis of the road data; first necessary engine braking amount determination means (14) to determine a first necessary engine braking amount in accordance with the predicted rolling amount; first required speed change stage determination means (15) to determine a first required speed change stage on the basis of the first necessary engine braking amount; second necessary engine braking amount calculation means (16) to calculate, when the corner is detected, a second necessary engine braking amount on the basis of a minimum required inter-vehicle distance needed to be kept between the vehicle and other vehicle ahead during the passage through the corner; second required speed change stage determination means (17) to determine a second required speed change stage in accordance with the calculated second engine braking amount; and transmission control means (18) to select, as a target speed change stage, either smaller one of the first required speed change stage or the second required speed change stage, and perform control so as to achieve a downshift to the selected target speed change stage.

When a corner is detected in a traveling direction of a vehicle on the basis of a current position of the vehicle and road data, and when an accelerator is in a fully closed state, a rolling amount exerted on the vehicle during passage through the corner is predicted, and a first necessary engine braking amount corresponding to the predicted rolling amount is determined, and a first required speed change stage is determined on the basis of the first necessary engine braking amount. Meanwhile a second necessary engine braking amount on the basis of a minimum required inter-vehicle distance during travelling through the corner is calculated, and a second required speed change stage is determined on the basis of the second necessary engine braking amount. Then, either smaller one of the first required speed change stage or the second required speed change stage is selected as a target speed change stage, and control is performed so as to achieve a downshift to the selected target speed change stage. It is therefore possible to automatically perform downshift control taking into consideration the characteristics of the corner and the inter-vehicle distance during the passage through the corner. It is also possible to automatically achieve a driver's intension of applying appropriate engine braking.

A transmission control device according to an embodiment further includes correction means (19) to correct, when a driver alters a speed change stage by a manual operation after the downshift control by the transmission control means, a determination rule for the first or second required speed change stage in the first required speed change stage determination means or the second required speed change stage determination means, on the basis of a transmission result by the manual operation. Consequently, when a speed change stage correction by the driver is made, it is possible to learn a result of the correction and perform a downshift being natural for the driver.

The above drawing reference numerals put in brackets are ones which illustrate corresponding components or the like in embodiments described later, for the purpose of reference.

With the present invention, the downshift control is performed based on either one of the first required speed change stage corresponding to the predicted rolling amount during the passage through the corner, and the second required speed change stage based on the minimum required inter-vehicle distance during the travelling through the corner. Accordingly, when travelling through the corner, it is possible to automatically perform the downshift control taking into consideration the characteristics of the corner and the inter-vehicle distance during the passage through the corner. This produces the excellent effect of automatically achieving the driver's intention of applying appropriate engine braking in front of the corner. The driver is therefore capable of traveling through the corner at ease.

MODE FOR CARRYING OUT THE INVENTION

An embodiment of the present invention is described in detail below with reference to the accompanying drawings.

Figure 1:
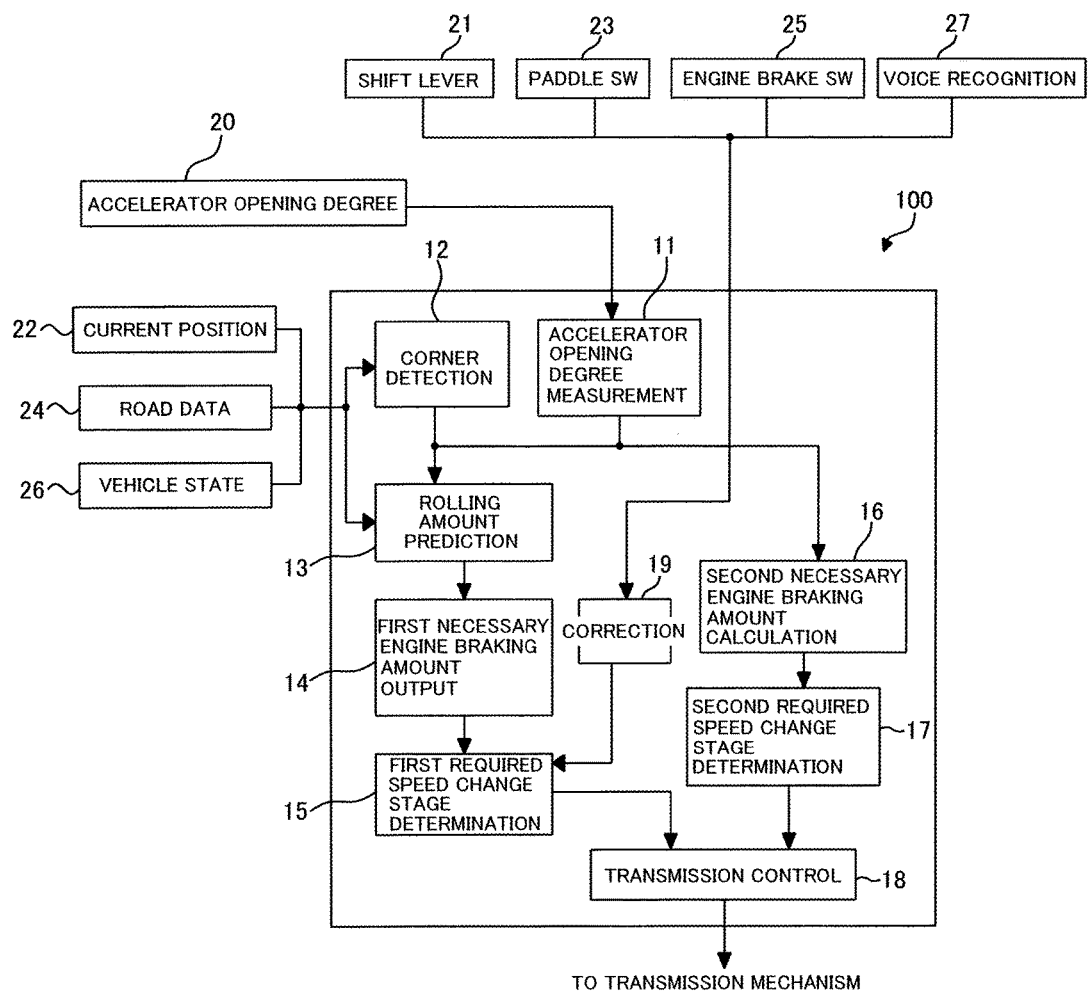
FIG. 1 is a functional block diagram that shows a configuration of a transmission control device for an automatic transmission according to an embodiment of the present invention.

FIG. 1 is a functional block diagram that shows a configuration of a transmission control device for an automatic transmission according to an embodiment of the present invention. The automatic transmission 100 is intended to transmit output of an engine (not shown) to driving wheels (not shown), and includes a transmission mechanism made up of a torque converter (not shown) and a multistage transmission gear mechanism (not shown). The automatic transmission 100 also includes a transmission control device 10 for controlling a speed change operation of the transmission mechanism (hereinafter also referred to as "transmission control"), and is configured to select one of a plurality of speed change stages by the transmission control of the transmission control device 10.

The transmission control device 10 is made up of a CPU, memory, an A/D converter, a D/A converter, and a microcomputer with an interface that acquires various kinds of information containing detection signals of various kinds of sensors and input signals through various kinds of user operations. The transmission control is performed by the CPU (processor unit) executing a software program stored in a memory (non-transitory computer readable storage medium).

An accelerator opening degree sensor 20, a current position detection sensor 22, road data storage means 24, and a vehicle state detection sensor 26 are coupled to the transmission control device 10. The accelerator opening degree sensor 20 detects an accelerator opening degree of an engine corresponding to an accelerator pedal operation by a driver, and then outputs a detection signal to the transmission control device 10. The vehicle state detection sensor 26 is intended to detect information about a running condition of one's own vehicle. The vehicle state detection sensor 26 is composed of, for example, a vehicle speed sensor to detect a speed of the one's own vehicle, and outputs a detected vehicle speed to the transmission control device 10. The vehicle state detection sensor 26 may include, besides the vehicle speed sensor, a weight sensor to detect a weight of the vehicle, a yaw rate sensor, a steering angle sensor, or the like.

The current position detection sensor 22 detects a current position of the one's own vehicle on the basis of, for example, a GPS measurement signal, and outputs a detected current position to the transmission control device 10. The road data storage means 24 is composed of, for example, a hard disk memory, a flash memory, a DVD-ROM, and a CD-ROM. The road data storage means 24 stores therein road data (road map data), and is capable of outputting the road data to the transmission control device 10. The current position detection sensor 22 and the road data storage means 24 can be composed of, for example, a well-known navigation device. Alternatively, the road data storage means 24 may be composed of a memory included in the transmission control device 10.

As shown in FIG. 1, the transmission control device 10 includes, as a module that achieves a function of automatically performing downshift control during passage through a corner, an accelerator opening degree measurement means (accelerator opening degree measurement module) 11, a corner detection means (corner detection module) 12, a rolling amount prediction means (rolling amount prediction module) 13, a first necessary engine braking amount determination means (first necessary engine braking amount determination module) 14, a first required speed change stage determination means (corner detection module) 15, a second necessary engine braking amount calculation means (first required speed change stage determination module) 16, a second required speed change stage determination means (second required speed change stage determination module) 17, a transmission control means (transmission control module) 18, and a correction means (correction module) 19. The transmission control device 10 includes an automatic transmission module to perform a regular transmission control, namely, control configured to automatically switch speed change stages in response to a vehicle speed and a rotative speed of the engine, and a manual transmission module to perform control configured to switch the speed change stages in response to a driver's manual operation. For simplicity, FIG. 1 shows only the modules 11 to 19 that achieve the function related to the automatic downshift control during traveling through a corner, and other well-known elements are properly omitted. The foregoing modules that achieve the various kinds of control functions can typically be computer program modules composed of instructions being executable by a processor unit. Besides ones which are composed of a computer program, the foregoing modules may be modules composed of a dedicated electric/electronic hardware device.

Means for inputting a speed change stage alter instruction by a manual operation are, for example, a shift lever 21, a paddle switch 23, an engine braking switch 25, or voice recognition means 27. The shift lever 21 includes shift positions, such as a parking range, a reverse travel range, a neutral range, a drive range, and a sport range. When selecting the sport range, an upshift instruction or a downshift instruction is input in response to the operation of the shift lever 21. The paddle switch 23 is made up of an upshift switch and a downshift switch disposed on a steering wheel, and is configured to input the upshift instruction or the downshift instruction in response to a switch operation. The engine braking switch 25 is a switch intended to execute an instruction for applying engine braking, and is configured to input the downshift instruction in response to a switch operation. The voice recognition means 27 is made up of a microphone to acquire voice produced by a driver, and a voice recognition module to supply an instruction signal corresponding to an acquired voice to the transmission control device 10. The voice recognition means 27 is configured to input the upshift or downshift instruction through the voice of the driver. The voice recognition module is made up, for example, a computer and a software program that causes the computer to execute a voice recognition function.

The accelerator opening degree measurement means 11 measures an accelerator opening degree of the engine on the basis of a detection signal being input from the accelerator opening degree sensor 20. The accelerator opening degree measurement means 11 needs to be capable of detecting at least whether the accelerator is fully closed or not.

The corner detection means 12 detects a current position of a vehicle and a corner appearing in a traveling direction on the basis of a current position of one's own vehicle being output from the current position detection sensor 22, and road data (road map data) being output from the road data storage means 24. Any conventionally known technology is applicable to the corner detection method.

In the transmission control device 10, the rolling amount prediction means 13, the first necessary engine braking amount determination means 14, and the first required speed change stage determination means 15 are components for performing, in front of a detected corner, downshift control that fits the characteristics of the corner. The downshift control that fits the characteristics of the corner is configured to performed when the accelerator opening degree measured by the accelerator opening degree measurement means 11 is a fully closed state. In other words, the downshift control that fits the characteristics of the corner according to the present invention is configured to be performed when the driver indicates a clear intention to decelerate by releasing an accelerator pedal and bringing the accelerator opening degree into the fully closed state.

Figure 2A:
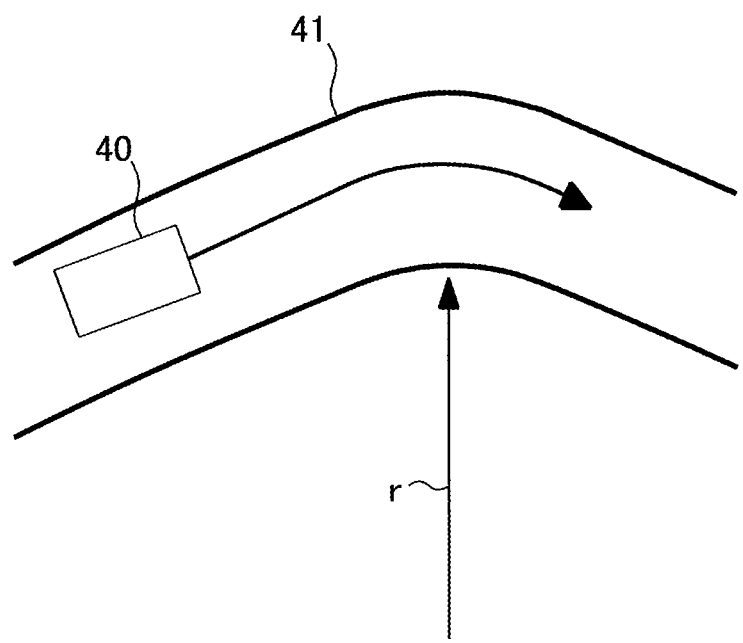
FIG. 2 is a diagram that describes a method of predicting a rolling amount of a vehicle at a corner.
Figure 2B:
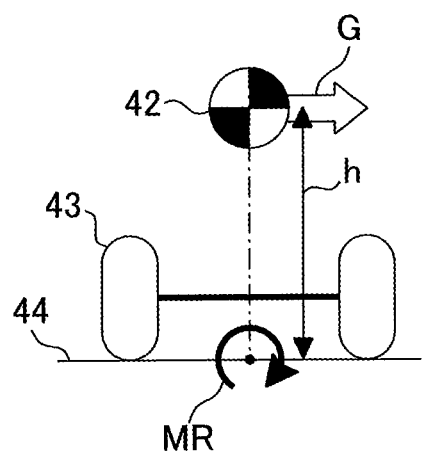

When a corner is detected by the corner detection means 12, the rolling amount prediction means 13 performs, on the basis of the road data, a prediction calculation of a rolling amount exerted on a vehicle during passage through the corner, in a simplified manner in front of the detected corner. The rolling amount prediction calculation processing by the rolling amount prediction means 13 may be performed when a determination is made that the accelerator opening degree measured by the accelerator opening degree measurement means 11 is the fully closed state, instead of being constantly performed on a corner basis. FIG. 2(*a*) is a diagram obtained by viewing from above a situation where a vehicle 40 passes through a certain corner 41. FIG. 2(*b*) is a diagram that describes a force exerted on the vehicle 40 during passage through the corner. As shown in FIG. 2(*a*), the rolling amount prediction means 13 predicts, in front of the corner, a rolling amount during the passage through the corner 41. A value of a turning radium R when the vehicle 40 passes through the corner 41 is previously contained on a corner basis in the road data stored in the road data storage means 24. A centrifugal force G exerted on a vehicle's center of gravity 42 of the vehicle 40 during the passage through the corner is calculable from the following equation (1). In the present specification, symbols are included in calculation equations in which "+" indicates addition symbol, "−" indicates subtraction symbol, "*" indicates multiplication symbol, "/" indicates division symbol, and "^2" indicates square symbol.

$$\text{Centrifugal force } G = (\text{Vehicle weight } m * \text{Vehicle speed } V\text{^2/Turning radium } R) \quad \text{(Equation 1)}$$

Here, the turning radium R is obtainable by referring to a value contained in the road data. The vehicle weight m and the vehicle speed V are obtainable from output of the vehicle state detection sensor 26.

The rolling amount MR is indicated by a rolling moment around the vehicle's center of gravity exerted on the vehicle during the passage through the corner. The rolling amount MR is calculable by multiplying the centrifugal force calculated from the above (Equation 1) by a height h from a contact patch 44 of a tier 43 to the vehicle's center of gravity 42 as indicated by the following (Equation 2).

$$\text{Rolling amount } MR = \text{Centrifugal force } G*h \quad \text{(Equation 2)}$$

Figure 3:
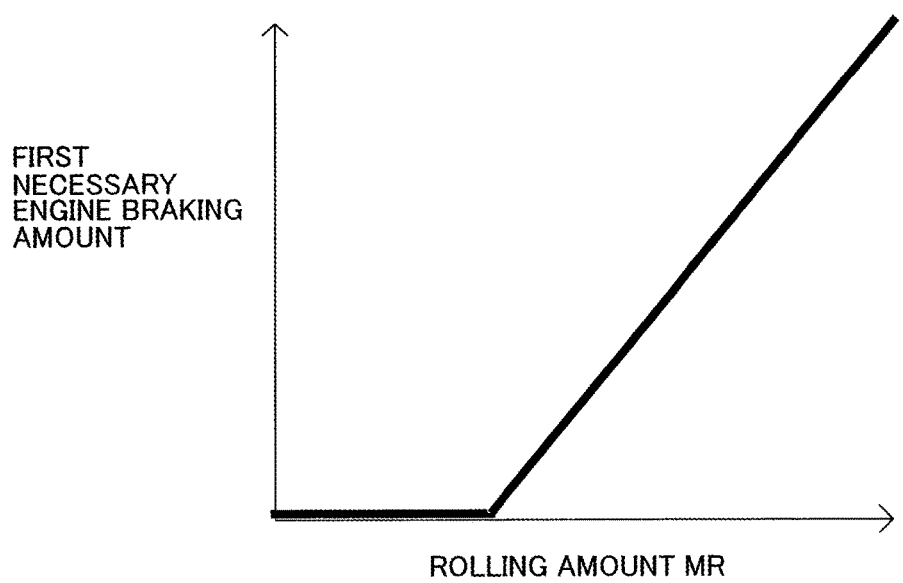
FIG. 3 is a diagram that describes an example of correspondence between rolling amount and first necessary engine braking amount.

The first necessary engine braking amount determination means 14 determines a first necessary engine braking amount corresponding to the rolling amount MR. The necessary engine braking amount is indicated by an engine braking force necessary for achieving a certain deceleration. Determination characteristics of the first necessary engine braking amount determination means 14 are set so as to determine a predetermined value corresponding to the rolling amount MR on the basis of, for example, sensory evaluation. FIG. 3 shows an example of the determination characteristics of the first necessary engine braking amount, in which an abscissa represents rolling amount MR and an ordinate represents first necessary engine braking amount. The determination characteristics are set so as to increase proportionally to the rolling amount MR. Therefore, for example, when a corner has a large curvature, a predicted rolling amount is large. Accordingly, the first necessary engine braking amount determination means 14 determines a relatively large value as the first engine braking amount. The first necessary engine braking amount determination means 14 can be specifically composed of a data table that prescribes the first necessary engine braking amount corresponding to, for example, the rolling amount MR.

Figure 4:
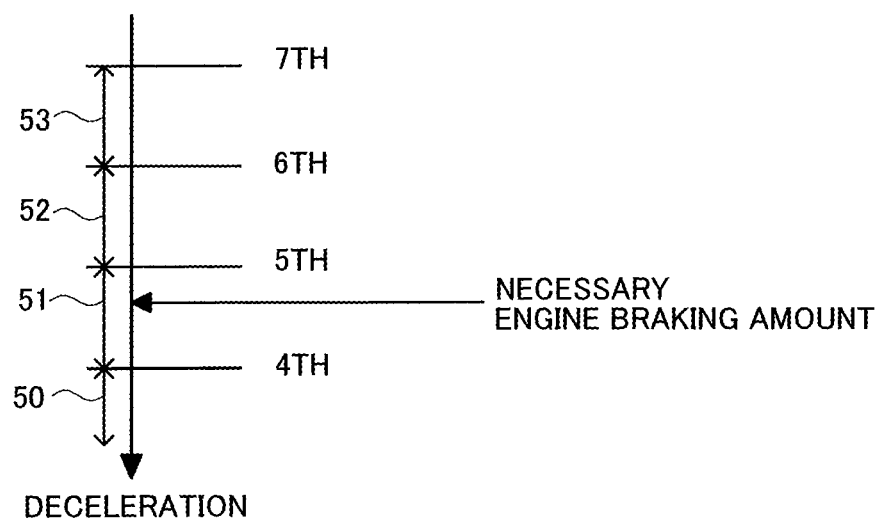
FIG. 4 is a diagram that describes an example of determination rules for a first required speed change stage corresponding to a first necessary engine braking amount.

The first required speed change stage determination means 15 determines a first required speed change stage corresponding to the first necessary engine braking amount in accordance with a predetermined determination rule. FIG. 4 is a diagram that describes an example of determination rules for a first required speed change stage corresponding to the first necessary engine braking amount performed by the first required speed change stage determination means 15. In FIG. 4, an ordinate represents engine braking amount (namely, deceleration), and the deceleration increases downward from the top in the drawing. Expected engine braking amount to be expected when selecting one of speed change stages of 7-speed ("7TH"), 6-speed ("6TH"), 5-speed ("5TH"), 4-speed ("4TH") . . . is calculable on the basis of various kinds of parameters in a running state from the following (Equation 3). An example of the determination rules is to select a speed change stage corresponding to an expected engine braking amount achieving a deceleration that is smaller by one stage relative to a deceleration of a necessary engine braking amount (namely, a speed change stage that achieves a deceleration smaller than the deceleration of the necessary engine braking amount). For example, when the necessary engine braking amount is in a range of 5TH and 4TH indicated by reference numeral 51, the required speed change stage determination means 15 determines, as a first required speed change stage, 5TH with lesser deceleration, and also determines, as a first required speed change stage, 4TH when the necessary engine braking amount is in a range indicated by reference numeral 50, 6TH when being in a range indicated by reference numeral 52, and 7TH when being in a range indicated by reference numeral 53. Thus, by selecting the speed change stage achieving the deceleration that is smaller by one stage relative to the deceleration of the necessary engine braking amount, it is possible to prevent excessive engine braking by the automatic downshift control. Because of being configured so as to determine the first necessary engine braking amount in accordance with the predicted rolling amount in front of the corner, and then determine the first required speed change stage in accordance with the first necessary engine braking amount, a required speed change stage that fits the characteristics of the corner is obtainable as a target speed change stage of downshift control.

The expected engine braking amount of each of the speed change stages is calculable, for example, from a sum of the following individual forces: (force 1), (force 2), and (force 3) as shown in (Equation 3).

$$\text{Engine braking amount of speed change stage} = (\text{force 1}) + (\text{force 2}) + (\text{force 3}) \quad \text{(Equation 3)}$$

(Force 1): damping force due to engine friction*ratio for each speed change stage*final ratio (Force 2): rolling resistance force=$\mu*W*\cos\theta$ (Force 3): air resistance force=$\frac{1}{2}*\rho*CD*S*(V/36)^2$ Here, "$\mu$" denotes coefficient of friction, "W" denotes load, "$\rho$" denotes air density, CD denotes air resistance coefficient, "S" denotes frontal projected area, and "V" denotes velocity.

The second necessary engine braking amount calculation means 16 and the second required speed change stage determination means 17 are components for performing, in front of a corner, downshift control to appropriately keep an inter-vehicle distance with the vehicle ahead during the passage through the corner. The downshift control for appropriately keeping the inter-vehicle distance with the vehicle ahead during the passage through the corner is also configured to be performed when the accelerator opening degree measured by the accelerator opening degree measurement means 11 is the fully closed state (namely, when the driver indicates an intention to decelerate).

Figure 5:
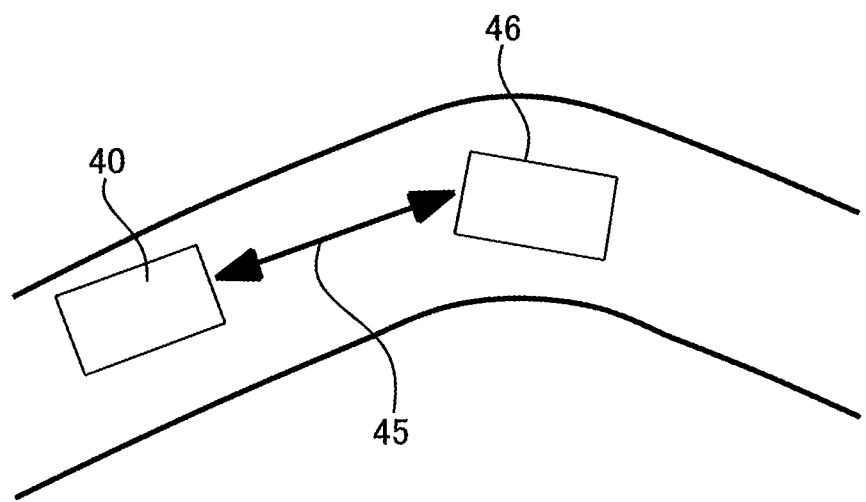
FIG. 5 is a diagram that describes a minimum required inter-vehicle distance during passage through a corner.

Upon detection of a corner, the second necessary engine braking amount calculation means 16 calculates a second necessary engine braking amount on the basis of a minimum required inter-vehicle distance that needs to be kept between one's own vehicle and other vehicle ahead during passage through the corner. The second necessary engine braking amount calculation processing by the second necessary engine braking amount calculation means 16 may be performed when a determination is made that the accelerator opening degree measured by the accelerator opening degree measurement means 11 is the fully closed state, instead of being constantly performed on a corner basis. FIG. 5 is a diagram that describes a minimum required inter-vehicle distance during passage through a corner. The minimum required inter-vehicle distance 45 is a target inter-vehicle distance that is at least required between the one's own vehicle 40 and the vehicle ahead 46 during the passage through the corner. The minimum required inter-vehicle distance 45 is set on the basis of, for example, sensory evaluation, to a predetermined value with which the driver is capable of travelling through the corner at ease without feeling uneasy when passing through the corner. Because the driver needs to drive more carefully when travelling through the corner than when travelling along a regular straight road, it is significant to set the minimum required inter-vehicle distance 45 dedicated for passing through the corner as an element of automatic downshift control, in order to improve a sense of security of the driver, or the like. The memory of the transmission control device 10 is configured to previously store a predetermined minimum required inter-vehicle distance being set on the basis of, for example, the sensory evaluation.

Figure 6:
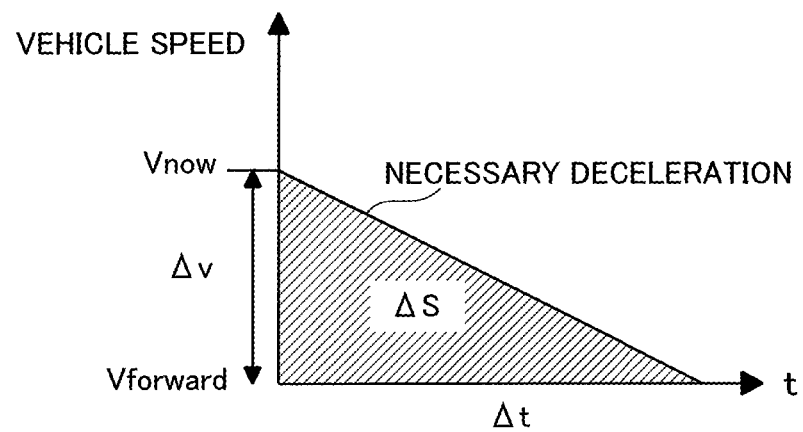
FIG. 6 is a diagram that describes a method of calculating a second necessary engine braking amount on the basis of a minimum required inter-vehicle distance.

FIG. 6 is a graph that describes a method of calculating a second necessary engine braking amount on the basis of a minimum required inter-vehicle distance, in which an ordinates represents vehicle speed and an abscissa represents time. The minimum required inter-vehicle distance ΔS is given as a predetermined value as described above. A current vehicle speed Vnow is acquirable from the vehicle state detection sensor 26. A current vehicle speed Vforward of the vehicle ahead is acquirable from, for example, a radar device (not shown). Acquisition of a vehicle speed or the like of the vehicle ahead from the radar device has conventionally been performed. A vehicle speed difference between the current vehicle speed Vnow and the vehicle speed Vforward of the vehicle ahead ("Vnow−Vforward") is referred to as "ΔV". A deceleration target time Δt is time needed to decelerate the current vehicle speed Vnow to the current vehicle speed Vforward of the vehicle ahead (namely, to reduce the vehicle speed distance ΔV to zero) at the minimum required inter-vehicle distance ΔS. As apparent from FIG. 6, the deceleration target time Δt is calculable on the basis of the minimum required inter-vehicle distance ΔS and the vehicle speed distance ΔV. A deceleration "ΔV/Δt" for reducing the vehicle speed difference ΔV to zero in a certain minimum required inter-vehicle distance ΔS is calculable by dividing the vehicle speed difference ΔV by the deceleration target time Δt.

Accordingly, the second necessary braking amount is calculable as a product of a vehicle weight m and a deceleration ΔV/Δt, namely, a braking force as shown in the following (Equation 4).

Second necessary braking amount=Vehicle weight
$m*(\Delta V/\Delta t)$ (Equation 4)

With the second necessary engine braking amount calculated as described above, the current vehicle speed of the one's own vehicle can be decelerated so that the inter-vehicle distance between the one's own vehicle and the vehicle ahead is kept at the minimum required inter-vehicle distance ΔS.

Figure 7:
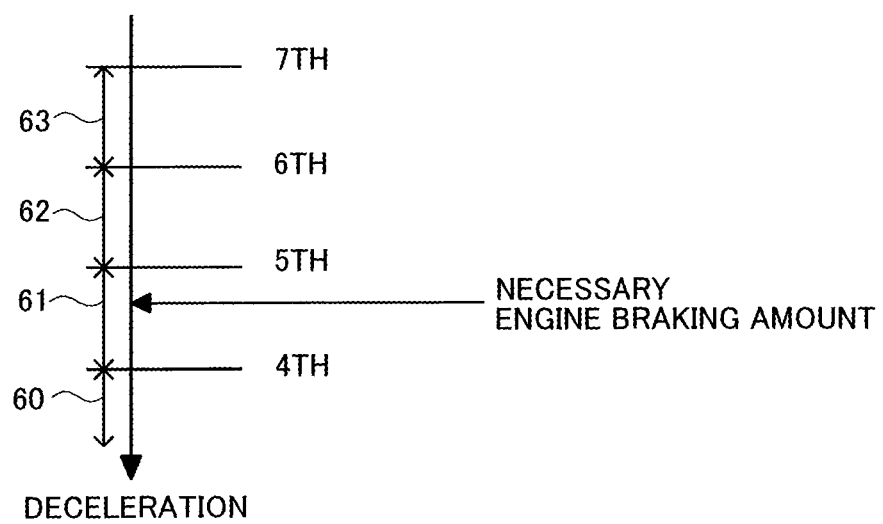
FIG. 7 is a diagram that describes an example of determination rules for a second required speed change stage corresponding to a second necessary engine braking amount.

The second required speed change stage determination means 17 determines a second required speed change stage corresponding to the calculated second necessary engine braking amount in accordance with a predetermined determination rule. As in the case with the foregoing first required speed change stage determination means 15, an example of determination rules is to determine, as a second required speed change stage, a speed change stage that achieves a deceleration smaller by one stage relative to the second necessary engine braking amount. For example, as exemplified in FIG. 7, when a deceleration of the second necessary engine braking amount is located between 5TH and 4TH indicated by reference numeral 61, the second required speed change stage determination means 17 determines, as a first required speed change stage, 5TH with lesser deceleration, and also determines, as a second required speed change stage, 4TH when the necessary engine braking amount is in a range indicated by reference numeral 60, 6TH when being in a range indicated by reference numeral 62, and 7TH when being in a range indicated by reference numeral 63. Because a minimum required inter-vehicle distance when passing through the corner is set, and the second required speed change stage is determined in accordance with the second necessary engine braking amount on the basis of the minimum required inter-vehicle distance, it is possible to obtain, as a target speed change stage of downshift control, a required speed change stage taking into consideration the minimum required inter-vehicle distance during the passage through the corner.

The transmission control means 18 selects, as a target speed change stage of automatic downshift control, either smaller one of the first required speed change stage determined by the first required speed change stage determination means 15 or the second required speed change stage determined by the second required speed change stage determination means 17. The transmission control means 18 then outputs a downshift instruction signal intended for a selected target speed change stage to the transmission mechanism, thereby automatically performing transmission control (namely, downshift control) to the selected target speed change stage. This makes it possible to obtain the speed change stage corresponding to a transmission factor having greater influence. For example, when the curvature of a corner is large, the first required speed change stage may be smaller than the second required speed change stage. When the curvature of the corner is small, the second required speed change stage may be smaller than the first required speed change stage. When the first required speed change stage is selected, automatic downshift control taking into consideration only the rolling amount during the passage through the corner, whereas because the first required speed change stage is smaller than the second required speed change stage, the inter-vehicle distance during the passage through the corner is kept at the minimum required inter-vehicle distance or more. When the second required speed change stage is selected, the automatic downshift control taking into consideration only the inter-vehicle distance during the passage through the corner, whereas because the second required speed change stage is smaller than the first required speed change stage, the vehicle speed can be decelerated to such a degree as to ensure a stable travel without being affected by the rolling amount during the passage through the corner.

Thus, it is possible to automatically perform, in front of a corner, the downshift control taking into consideration the characteristics of the corner and the minimum required inter-vehicle distance during the passage through the corner. This makes it possible to automatically achieve the driver's intention of applying the appropriate engine braking in front of the corner. In particular, with the multi-staged automatic transmission 100, it takes much time to obtain the intended engine braking amount by a manual downshift operation on a one stage basis. It is however possible to apply an optimum engine braking without spending much time, owing to the configuration adapted to automatically perform the downshift to an optimum speed change stage that fits the characteristics of the corner and the minimum required inter-vehicle distance during the passage through the corner. The driver is therefore capable of traveling the corner at ease.

Meanwhile, when the engine braking amount obtained by the automatic downshift control is larger or smaller than that expected by the driver, the driver is assumed to correct the speed change stage by a manual operation using the shift lever 21, the paddle switch 23, or the like. When the driver alters the speed change stage by the manual operation after the automatic downshift control, the correction means 19 learns an altered result of the speed change stage by the manual operation, and corrects the determination rules in the first required speed change stage determination means 15 and/or the second required speed change stage determination means 17.

As an example, when the driver has altered the speed change stage by the manual operation after the downshift to the first required speed change stage determined by the first required speed change stage determination means 15, the correction means 19 corrects the determination rules in the first required speed change stage determination means 15 on the basis of a speed change stage after transmission through the manual operation.

Figure 8A:
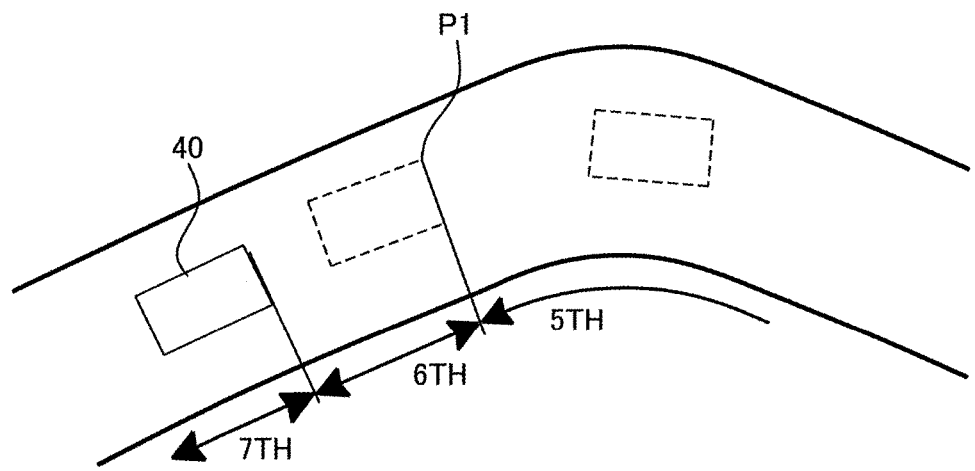
FIG. 8 is a diagram that describes, as an example of manual corrections to a first required speed change stage, an example of corrections made when an engine braking amount by a determined first required speed change stage is smaller than that expected by a driver.
Figure 8B:
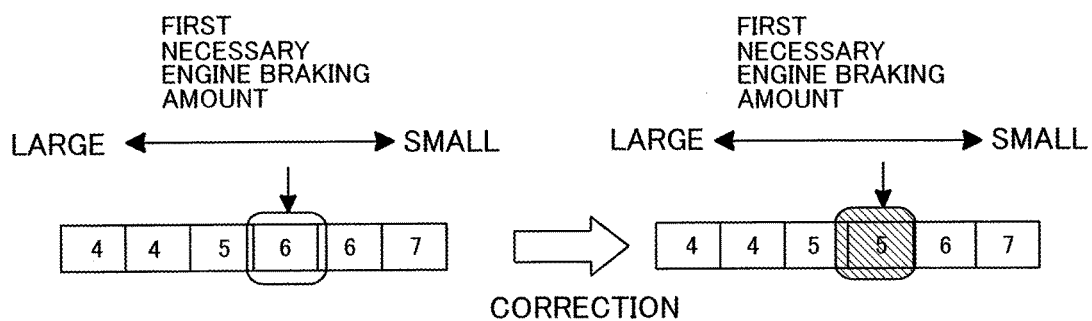

FIG. 8 is a diagram that describes cases where an engine braking amount by the automatic downshift control is smaller than that expected by a driver (namely, a downshift amount is insufficient). As shown in FIG. 8A, after a speed change stage of the vehicle 40 is automatically downshifted from 7TH to 6TH in front of a corner, the speed change stage is corrected from 6TH to 5TH at position P1 by the manual operation of the driver. In this case, the correction means 19 corrects the determination rule in the first required speed change stage determination means 15 to that shown in FIG. 8B. Specifically, when 6TH is selected with respect to a certain first necessary engine braking amount this time, the correction means 19 corrects the determination rule in the first required speed change stage determination means 15 so as to select 5TH with respect to the certain first necessary engine braking amount. When making this correction, the correction means 19 is configured to correct the entire determination rule so as to prevent contradictions from occurring in correspondence between the first necessary engine braking amount and other speed change stages.

Figure 9A:
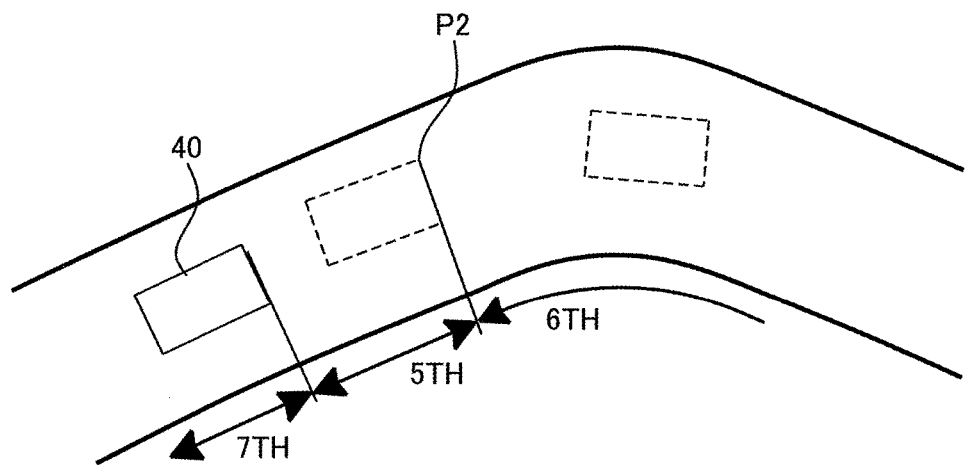
FIG. 9 is a diagram that describes, as an example of manual corrections to the first required speed change stage, an example of corrections made when an engine braking amount by the determined first required speed change stage is larger than that expected by a driver.
Figure 9B:
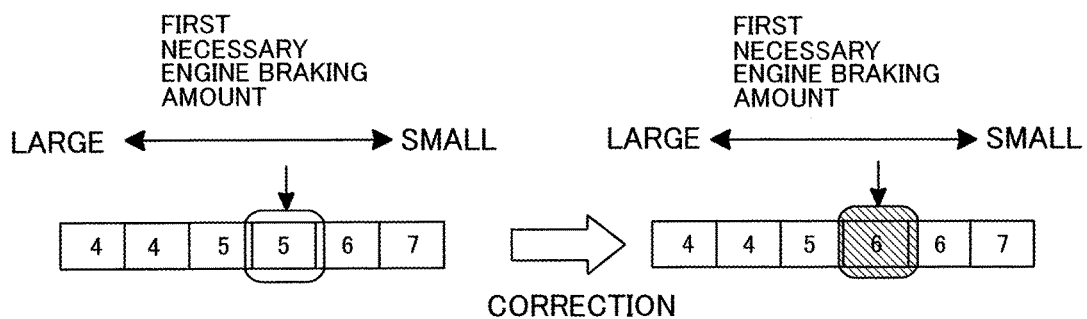

FIG. 9 is a diagram that describes cases where an engine braking amount by the automatic downshift control is larger than that expected by a driver (namely, a downshift amount is excessive). As shown in FIG. 9A, after a speed change stage of the vehicle 40 is automatically downshifted from 7TH to 5TH in front of a corner, the speed change stage is corrected from 5TH to 6TH at position P2 by the manual operation of the driver. In this case, the correction means 19 corrects the determination rule in the first required speed change stage determination means 15 to that shown in FIG. 9B. Specifically, when 5TH is selected with respect to a certain first necessary engine braking amount this time, the correction means 19 corrects the determination rule in the first required speed change stage determination means 15 so as to select 6TH with respect to the certain first necessary engine braking amount.

Because the correction means 19 corrects the determination rule in the first required speed change stage determination means 15, the first required speed change stage determination means 15 is capable of determining a speed change stage corresponding to a correction result on and after next time. Hence, by including the correction means 19, it is possible to learn the driver's intention indicated by the speed change stage correction by the manual operation, thus achieving the automatic downshift control being natural for the driver.

Figure 10:
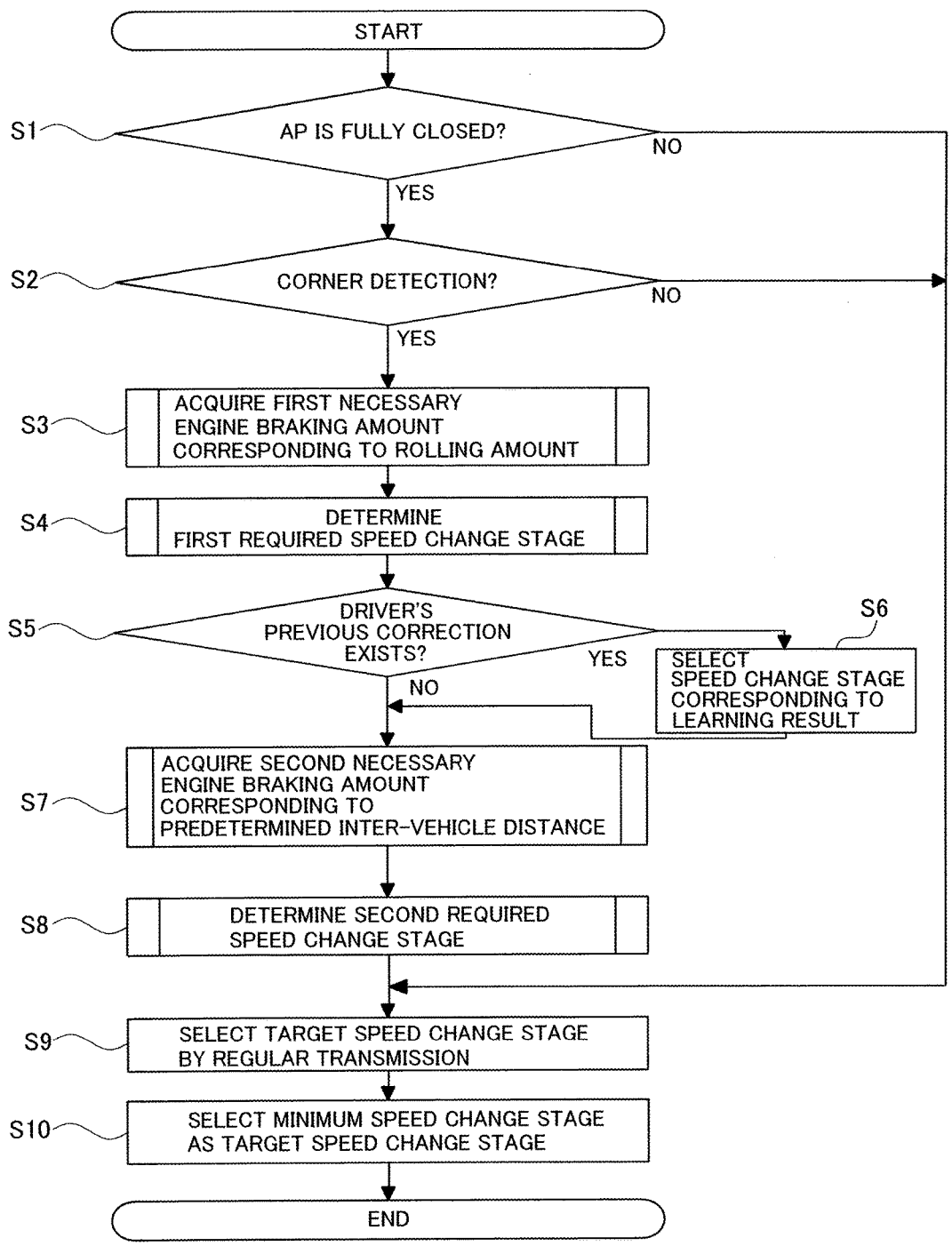
FIG. 10 is a flow chart that shows an example of automatic transmission control processing performed by a transmission control device for an automatic transmission according to an embodiment of the present invention.

FIG. 10 is a flow chart that shows an example of automatic transmission control processing performed by a CPU of the transmission control device 10. For example, upon detection of a corner in a traveling direction of a vehicle, the CPU of the transmission control device 10 starts processing in FIG. 5. In step S1, the CPU of the transmission control device 10 determines whether an accelerator opening degree of the engine measured by the accelerator opening degree measurement means 11 ("AP" in the drawing) is the fully closed state or not. When the accelerator opening degree is not fully closed (NO in step S1), the CPU of the transmission control device 10 advances processing to step S9 without performing the automatic downshift control in step S2 and subsequent steps.

When the accelerator opening degree is fully closed (YES in step S1), the CPU of the transmission control device 10 determines in step S2 as to whether a corner is detected in a traveling direction of a vehicle (the operation of the corner detection means 12). When a corner is detected in the traveling direction of the vehicle (YES in step S2), in step S3, the CPU of the transmission control device 10 predicts a rolling amount during passage through the corner, and acquires a first necessary engine braking amount on the basis of the predicted rolling amount (the operations of the rolling amount prediction means 13 and the first necessary engine braking amount determination means 14). In step S4, the CPU of the transmission control device 10 determines a first required speed change stage corresponding to the acquired first necessary engine braking amount (the operation of the first required speed change stage determination means 15). This makes it possible to obtain the first required speed change stage that fits the characteristics of the corner.

In the first required speed change stage determination in the step S4, the CPU of the transmission control device 10 determines whether a manual correction by the driver is made or not when a previous required speed change stage is selected (step S5). When the manual correction is made (YES in step S5), the CPU of the transmission control device 10 selects, as a first required speed change stage, a speed change stage corresponding to a learning result according to the manual correction (namely, a correction to the determination rule) (step S6). This makes it possible to obtain the first required speed change stage corresponding to the learning result of the manual correction when there was the manual correction by the driver in the past.

In step S7, the CPU of the transmission control device 10 acquires a first necessary engine braking amount on the basis of a predetermined minimum required inter-vehicle distance (the operation of the second necessary engine braking amount calculation means 16). In step S8, the CPU of the transmission control device 10 determines a second required speed change stage corresponding to the acquired second necessary engine braking amount (the operation of the second required speed change stage determination means 17). This makes it possible to obtain the second required speed change stage taking into consideration the minimum required inter-vehicle distance during the passage through the corner.

Separately from the automatic downshift control when entering the corner in the steps S3 to S8, the CPU of the transmission control device 10 accepts, in step S9, selection of a target speed change stage by a regular automatic or manual transmission control. Then, in step S10, the CPU of the transmission control device 10 selects, as a target speed change stage, a minimum speed change stage from among the first required speed change stage selected in the step S4 or S6, the second required speed change stage selected in the step S8, and the target speed change stage selected in the step S9, and then outputs a downshift instruction signal intended for a selected target speed change stage to the transmission mechanism (the operation of the transmission control means 18). For example, while traveling along a downhill, a speed change stage of a low ratio can be selected by the regular automatic transmission control. The driver may manually select the speed change stage of the low ratio by the manual operation. By selecting a minimum speed change stage in the step S8, it becomes possible to perform transmission control taking into consideration speed change factors other than the characteristics of the corner and the minimum required inter-vehicle distance, as well as the driver's intention, instead of usually, surely performing the downshift control based on the predicted rolling amount or the minimum required inter-vehicle distance during the passage through the corner. Although the processing of the step S1 (the processing of determining whether the accelerator opening degree is fully closed or not) is carried out efficiently if performed at the first stage of the flow in FIG.

10, this processing may be performed at any stage of steps S2 to S8, instead of the first stage.

Figure 11:
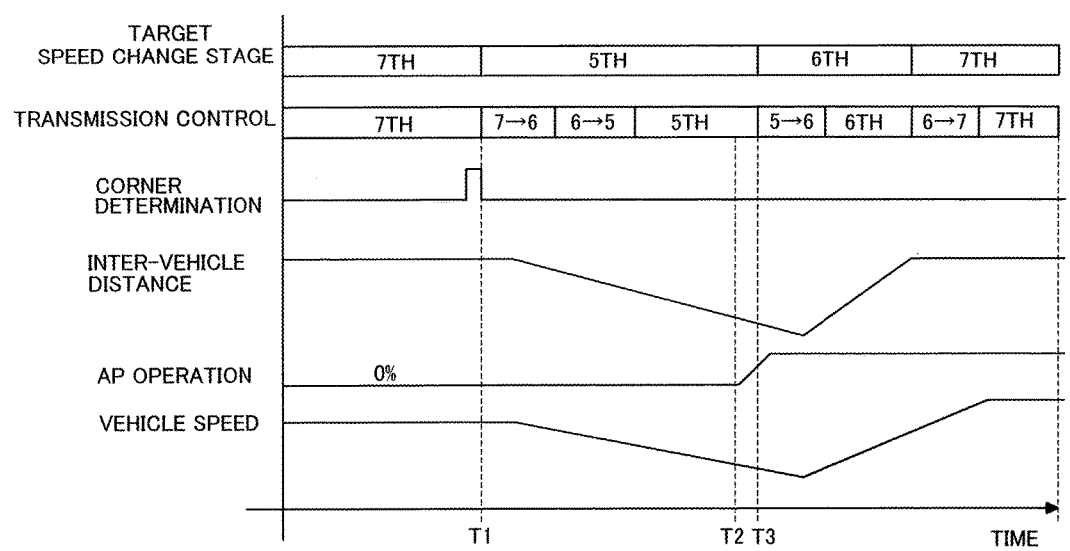
FIG. 11 is a time chart that describes an example of downshift operations during passage through a corner.

FIG. 11 is a time chart that describes an operation when performing the automatic downshift control from 7-speed to 5-speed in front of a corner. Assume in FIG. 11 that 7-speed (7TH) is already selected as a target speed change stage of the automatic transmission control before a corner detection point T1, and the transmission control device 10 has selected 7-speed (7TH) by transmission control. Also assume that the accelerator opening degree (AP operation) is in the fully closed state with an opening degree of 0%.

When a corner in front of a vehicle is detected at T1 (YES in the step S2), the CPU of the transmission control device 10 determines a first required speed change stage corresponding to the predicted rolling amount during the passage through the corner, and a second required speed change stage taking into consideration the minimum required inter-vehicle distance during the passage through the corner, and sets, as a target speed change stage, 5-speed (5TH) that is the minimum speed change stage of the first required speed change stage and the second required speed change stage (the steps S3 to S10). In response to this, the transmission control device 10 performs downshift control from the current speed change stage 7TH to the target speed change stage 5TH. FIG. 11 shows an example of downshift control. That is, the downshift control is sequentially performed on a one stage basis in the following procedure that firstly from 7TH to 6TH ("7→6" in the drawing), then from 6TH to 5TH ("6→5" in the drawing), and thereafter from 6TH to 5TH ("5TH" in the drawing). Although the inter-vehicle distance with the vehicle ahead decreases as the vehicle travels forward, a current vehicle speed can be appropriately decelerated because engine braking is applied by the automatic downshift control. It is therefore possible to keep the inter-vehicle distance with the vehicle ahead at the minim required inter-vehicle distance or more. It is also possible to, for example, effectively stabilize the vehicle behavior while traveling through the corner, and immediately generate a driving force at a rising of the corner. Additionally, because it is configured to automatically perform downshift, an appropriate engine braking amount is rapidly obtainable in less time than the case of manually instructing downshift on a one stage basis.

The driver increases an accelerator opening degree by performing an accelerator pedal operation immediately before the vehicle leaves the corner ("T2" in the drawing). In response to the accelerator operation, the transmission control device 10 selects 6-speed ("6TH" in the drawing) as a target speed change stage by the regular transmission control, and performs upshift control from 5TH to 6TH ("T3" in the drawing). After passing through the corner, as the vehicle speed increases, the transmission control device 10 selects 7TH as a target speed change stage, and performs upshift control from 6TH to 7TH. Thus, a stable travel is achievable by appropriately decelerating in front of the corner, thereby ensuring a smooth acceleration after it is possible to see the other end of the corner.

In FIG. 6, when performing the transmission control from 7TH to 5TH, the downshift is sequentially performed in the following manner: firstly, from 7TH to 6TH, and then from 6TH to 5TH. Without being limited thereto, a direct downshift from the current speed change stage (7TH) to the target speed change stage (5TH) may be performed.

While the embodiments of the present invention have been described above, the present invention is not limited to the above embodiments, and various modifications may be made within the scope of the technical ideas described in the claims, specification, and drawings. For example, the method of predicting a rolling amount is not limited to the above method. The method of calculating the first and second necessary engine braking amounts is not limited to the above method. The correction means 19 is configured to correct the determination rule in the first required speed change stage determination means 15 and the second required speed change stage determination stage 17 in accordance with the correction by the manual operation. For example, when the second required speed change stage is selected as a target speed change stage, the determination rule in the second required speed change stage determination means 17 may be corrected in accordance with the correction by the manual operation. In that case, the CPU of the transmission control device 10 performs, after the step S8, the determination of the presence or absence of a previous manual correction in step S5, and selection of the second speed change stage in accordance with the learning result in S6. Alternatively, the automatic transmission 100 may be one which has any mechanism.

The invention claimed is:

1. A transmission control device for an automatic transmission, comprising:
   a current position detection means configured to detect a current position of a vehicle;
   a storage means configured to store road data;
   a corner detection means configured to detect a corner appearing in a traveling direction of the vehicle based upon the detected current position and the stored road data;
   a prediction means configured to predict, when the corner is detected, a rolling amount exerted on the vehicle during passage through the corner, based upon the road data;
   a first necessary engine braking amount determination means configured to determine a first necessary engine braking amount in accordance with the predicted rolling amount;
   a first required speed change stage determination means configured to determine a first required speed change stage in accordance with the first necessary engine braking amount;
   a second necessary engine braking amount calculation means configured to calculate, when the corner is detected, a second necessary engine braking amount based upon a minimum required inter-vehicle distance needed to be kept between the vehicle and other vehicle ahead during the passage through the corner;
   a second required speed change stage determination means configured to determine a second required speed change stage in accordance with the calculated second engine braking amount;
   a transmission control means configured to select, as a target speed change stage, either smaller one of the first required speed change stage or the second required speed change stage, and perform control so as to achieve a downshift to the selected target speed change stage; and
   a correction means configured to correct, when a driver alters a speed change stage by a manual operation after downshift control by the transmission control means, a determination rule for the first or second required speed change stage in the first required speed change stage determination means or the second required speed change stage determination means, based upon a transmission result by the manual operation.

2. The transmission control device for the automatic transmission according to claim 1, wherein control to achieve a downshift to the selected target speed change stage is performed on a condition that an accelerator opening degree of an engine is a fully closed state.

3. A non-transitory computer readable medium having stored thereon processor-executable instructions configured to perform a method, comprising the steps of:

detecting a corner appearing in a traveling direction of a vehicle based upon a current position of the vehicle and road data;

predicting, when the corner is detected, a rolling amount exerted on the vehicle during passage through the corner, based upon the road data;

determining a first necessary engine braking amount in accordance with the predicted rolling amount;

determining a first required speed change stage in accordance with the first necessary engine braking amount;

calculating, when the corner is detected, a second necessary engine braking amount on a basis of a minimum required inter-vehicle distance needed to be kept between the vehicle and other vehicle ahead during the passage through the corner;

determining a second required speed change stage in accordance with the calculated second engine braking amount;

selecting, as a target speed change stage, either smaller one of the first required speed change stage or the second required speed change stage, and performing control so as to achieve a downshift to the selected target speed change stage; and correcting, when a driver alters a speed change stage by a manual operation after downshift control, a determination rule for the first or second required speed change stage, based upon a transmission result by the manual operation.

* * * * *